US 8,297,449 B2

(12) United States Patent
Afzali-Ardakani et al.

(10) Patent No.: US 8,297,449 B2
(45) Date of Patent: Oct. 30, 2012

(54) NANOPOROUS SEMI-PERMEABLE MEMBRANE AND METHODS FOR FABRICATING THE SAME

(75) Inventors: Ali Afzali-Ardakani, Yorktown Heights, NY (US); Stephen M. Rossnagel, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 383 days.

(21) Appl. No.: 12/685,734

(22) Filed: Jan. 12, 2010

(65) Prior Publication Data
US 2011/0168560 A1  Jul. 14, 2011

(51) Int. Cl.
B01D 29/46 (2006.01)
B01D 39/00 (2006.01)
B01D 39/14 (2006.01)
B05D 5/00 (2006.01)
B05D 1/36 (2006.01)
B29C 44/04 (2006.01)

(52) U.S. Cl. .............. 210/490; 210/500.25; 210/500.26; 264/45.1; 427/256; 427/402; 977/778

(58) Field of Classification Search .................. 210/500.25–500.26, 490, 650, 210/653; 264/45.1; 204/521, 632, 204, 638; 427/256, 402
See application file for complete search history.

(56) References Cited

U.S. PATENT DOCUMENTS

| | | | |
|---|---|---|---|
| 3,977,967 A | 8/1976 | Trulson et al. | |
| 4,473,474 A | 9/1984 | Ostreicher et al. | |
| 4,604,208 A | 8/1986 | Chu et al. | |
| 4,673,504 A | 6/1987 | Ostreicher et al. | |
| 4,708,803 A | 11/1987 | Ostreicher et al. | |
| 4,889,631 A | 12/1989 | Rigby et al. | |
| 6,462,935 B1 | 10/2002 | Shiue et al. | |
| 6,579,463 B1 * | 6/2003 | Winningham et al. | 216/41 |
| 7,252,769 B2 | 8/2007 | Dickinson | |
| 7,855,133 B2 * | 12/2010 | Afzali-Ardakani et al. | 438/585 |
| 7,951,424 B2 * | 5/2011 | Afzali-Ardakani et al. | 427/256 |
| 2006/0278580 A1 | 12/2006 | Striemer et al. | |
| 2010/0219079 A1 * | 9/2010 | Routkevitch et al. | 205/175 |
| 2010/0255487 A1 * | 10/2010 | Beechem et al. | 435/6 |

OTHER PUBLICATIONS

Yamaguchi et al., "Self-assembly of a silica-surfactant nanocomposite in a porous alumina membrane", Nature Materials, vol. 3, May 2004, pp. 337-341.
International Search Report for International Application No. PCT/US11/20653; Filed Jan. 10, 2011; 8 pages.
Written Opinion of the International Searching Authority for International Application No. PCT/US11/20653; Filed Jan. 10, 2011; 4 pages.
Jessensky, O. et al., "Self-organized formation of hexagonal pore arrays in anodic alumina" (c) 1998 American Institute of Physics, Applied Physics Letters, vol. 72, No. 10, dated Mar. 9, 1998, pp. 1173-1175.

(Continued)

*Primary Examiner* — Ana Fortuna

(74) *Attorney, Agent, or Firm* — Cantor Colburn LLP; Vazken Alexanian

(57) ABSTRACT

A filter includes a membrane having a plurality of nanochannels formed therein. Functionalized nanoparticles are deposited through self assembly onto surfaces defining the nanochannels so as to decrease the final diameter of the membrane. Methods for making and using the filter are also provided.

20 Claims, 3 Drawing Sheets

OTHER PUBLICATIONS

Jung, Mi et al., "Fabrication of CdTe Quantum Dot Arrays on GaAs utilizng Nanoporous Alumina Masks" Mat. Res. Soc. Symp. Proc. vol. 818; (c) 2004 Materials Research Society, pp. M11.38.1-M11.38.5.

Sklar, G.P. et al. "Pulsed electrodeposition into AAO templates for CVD growth of carbon nanotube arrays", (c) 2005 IOP Publishing Ltd. Institute of Physics-Publishing, Nanotechnology, vol. 16, (2005), pp. 1265-1271.

Wang, Hau, H., et al. "Nanowire and Nanotube Syntheses Through Self-assembled Nanoporous AAO Templates", Mat, Res. Soc. Sympo. Proc. vol. 775; (c) 2003 Materials Research Society, pp. 4.8.1-4.8.6.

Paper, Cabasso, I., Gulf South Research Inst., New Orleans, LA, "New Polymeric Membrane Containing Phosphonate Ester Groups for Desalination", Final Rept. Jun. 25, 1976-Jun. 24, 1977, 1 page.

* cited by examiner

NANOPOROUS SEMI-PERMEABLE MEMBRANE AND METHODS FOR FABRICATING THE SAME

BACKGROUND

The present invention relates to semi-permeable membranes, and more particularly, to nanoporous membranes and methods for making and using the same for desalination and other processes.

Water desalination may be thought of in terms of two approaches. The two basic approaches for water desalination include reverse osmosis and distillation. The distillation approach requires converting fluid water to the vapor phase and condensing water from the vapor. This approach is fairly high cost and requires significant energy usage. The reverse osmosis approach uses pressure on a salinated liquid to force water molecules through a semi-permeable membrane. This approach has a relativity low rate of energy consumption.

The specific (per unit of produced potable water) energy of desalination using reverse osmosis has been reduced from over 10 kWh/m$^3$ in the 1980s to below 4 kWh/m$^3$, approaching the theoretical minimum required energy of 0.7 kWh/m$^3$. To improve the state of art of the reverse osmosis approach, new membranes, with a uniform pore distribution and a more permeable separation layer can potentially maintain or improve salt rejection while increasing the flux in the reverse osmosis method. The pore size of membranes for effective desalination is on the order of 10 nanometers or less. Current processes for achieving these dimensions are rather complicated, costly, and time consuming. One method employs commercially available anodized aluminum oxide films that have parallel arrays of nanochannels having diameters of 10 to 200 nm or greater. To narrow the pore size, surface charged materials are deposited at the openings of the nanochannels by chemical vapor deposition, atomic layer deposition, or physical vapor deposition. Alternatively, an oxide layer is formed at the inlet openings by atomic layer deposition. Multiple passes are required to attain a desired thickness and pore diameter. These processes are time consuming, complex, and relatively costly to obtain the desired diameters suitable for desalination. Moreover, the current processes merely narrow the inlet opening of the nanochannel.

Accordingly there is a need in the art for improved membranes having openings less than 10 nm, wherein the process is efficient and economically practical for production purposes.

SUMMARY

Disclosed herein are filters, filter systems, and methods for fabricating nanoporous membranes for the filters. In one embodiment, a filter comprises a porous membrane having a plurality of nanochannels formed therein, wherein the nanochannels include an oxide surface and have a first diameter; and a self assembled film of functionalized nanoparticles, wherein the functionalized nanoparticles comprise a nanoparticle and an organic ligand disposed thereon having at least one functional group reactive with the oxide surface, wherein the self assembled film decreases the first diameter to a second diameter.

A filter system comprises a first volume configured to receive an electrolytic solution at a pressure; and a second volume separated from the first volume by a membrane having a plurality of nanochannels formed therein, the nanochannels including a first diameter, and a self assembled monolayer of nanoparticles attached to a surface of the nanochannels, wherein the self assembled monolayer provide the filter system with a second diameter, the second diameter being less than the first diameter, and wherein the second diameter is effective to prevent transport of ions in the electrolytic solution through the membrane.

A method for making a filter comprises narrowing a diameter of each nanochannel in a porous membrane material comprising attaching a self assembled monolayer of functionalized nanoparticles to an interior surface of each nanochannel, wherein each of the functionalized nanoparticles comprise a nanoparticle and an organic ligand attached to the nanoparticles comprising at least one functional group effective to react with and form a self assembled monolayer of the nanoparticles on the interior surface.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Figure 1:
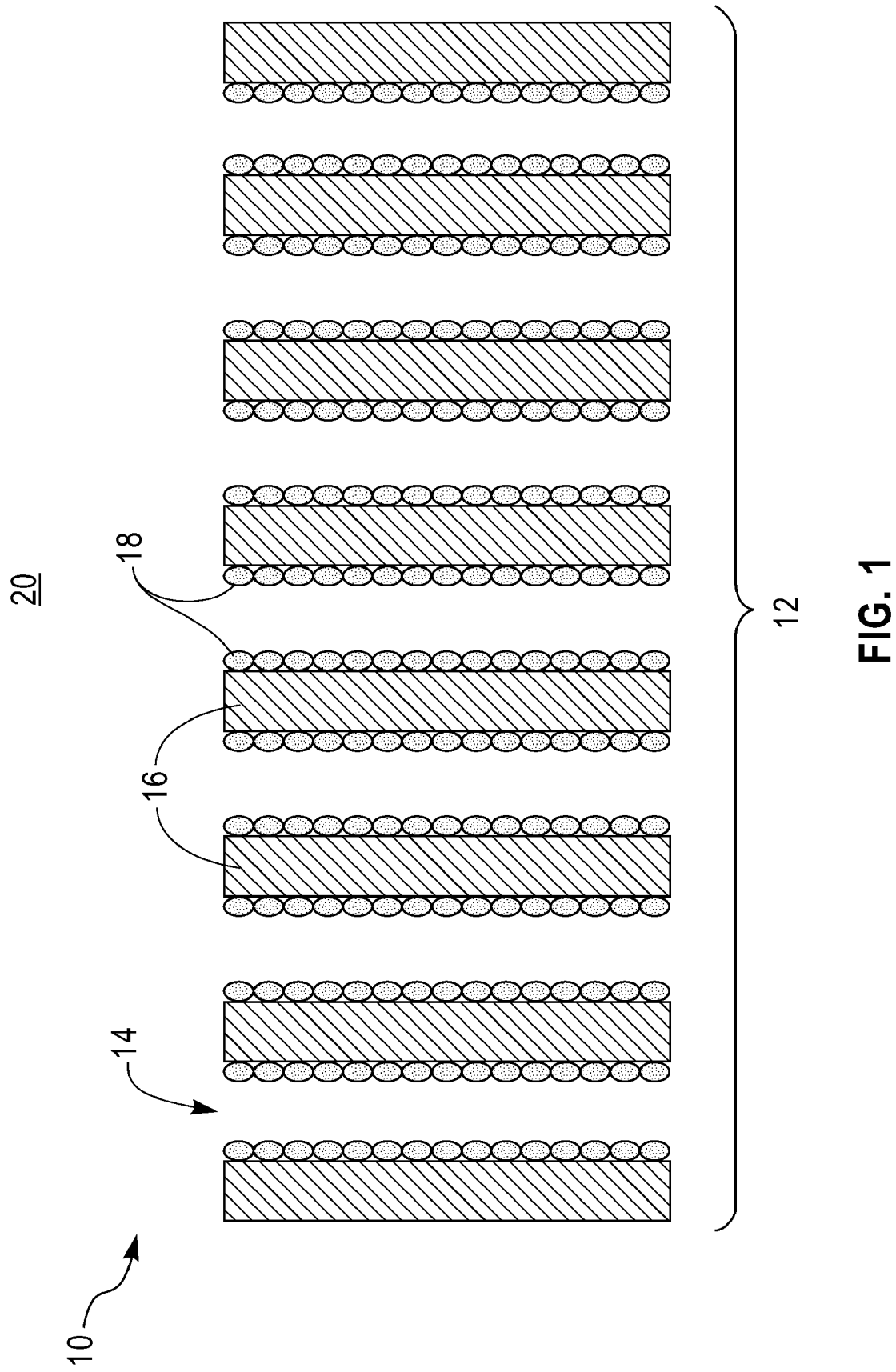
FIG. 1 is a cross-sectional view taken along a longitudinal axis of nanotubes or nanochannels through a membrane showing the nanochannels in accordance with one illustrative embodiment.

In accordance with the present invention, a new semi-permeable nanoporous membrane and process for forming the membrane is described. The semi-permeable membrane includes a porous membrane having an array of parallel nanochannels of a defined diameter, wherein the interior surfaces defining the fluid passageways of the nanochannel are reacted with functionalized nanoparticles through self assembly to further narrow the diameter. In one embodiment, the size of the functionalized nanoparticles is selected to narrow the diameter of the porous membrane nanochannels to a dimension effective to block transport of ions through the fluid passageways, thereby functioning as an ion filter. Unlike prior art processes, the inventive process for fabricating the membrane is simple, efficient, and commercially viable.

The semi-permeable membrane is formed from porous membrane materials that include parallel arrays of nanochannels generally having a diameter of about 20 to about 300 nm. The porous membrane material can be fabricated by electrolytic passivation of a metal film, e.g., anodization, using well known processes. For example, porous anodized aluminum oxide films of varying thicknesses are commercially available or can be prepared by anodization of an aluminum film in oxalic acid, sulfuric acid, chromic acid, and/or phosphoric acids under various reaction conditions well known in the art. With repeated anodization-etching cycles, highly orders straight nanochannels can be prepared though self-organization. Exemplary processes are disclosed in the articles entitled, "Nanowire and Nanotube Syntheses Through Self-assembled Nanoporous AAO Templates" to Wang et al.; "Self-organized formation of hexagonal pore arrays in anodic alumina" to O. Jessensky et al., Appl. Phys. Lett, 72, (1998) p 1173; and "Pulsed deposition into AAO templates for CVD growth of carbon nanotube arrays" to G. Sklar et al., Nanotechnology, 16 (2005) 1265-1271). These processes can be used to form high aspect ratio, parallel nanochannels into the aluminum film by an anodic oxidation process. Although specific reference has been made to anodized aluminum oxide, the invention is not intended to be limited to such. Other membrane materials are contemplated.

The porous membrane material may be formed in sheets and cut to size or may be formed in or included with pre-sized panels. For desalination applications, the porous membrane material is a porous membrane having a nanochannel diameter of 20 to 30 nm. The porous membrane material is treated with a solution of the functionalized nanoparticles, wherein the particular functional group of the functionalized nanoparticles is selected to react with the oxide surface. In this manner, self-assembly of a single monolayer of the functionalized nanoparticles can be formed on the interior surface of nanochannel, and unlike the prior art, can coat the entire surface from the inlet opening of to the outlet opening. Depending on the starting diameter of the porous membrane material, the functionalized nanoparticles can be chosen so that after decoration of the interior surfaces defining the nanochannels, the distance between opposing nanoparticles becomes less than 20 nm in some embodiments, less than 10 nm in other embodiments, and about 5 nm, in still other embodiments. For desalination, the final pore diameter provided by the membrane is 2 to 3 nm. The final diameter can be effectively controlled by careful selection of the nanoparticles particle size and ligand. In this manner, the membrane and its subsequent use as a filter can be tailored to a given application. For desalination processes, the filters can be utilized for reverse osmosis applications wherein all ions are effectively blocked such that water only flows through the nanochannels. However, other physical or chemical processes may employ the present principles.

As used herein, the term "nanoparticle" generally refers to any nanomaterial having at least one dimension less than 100. The nanoparticles may, or, may not be crystalline. Suitable nanoparticles are not intended to be limited to any particular material so long as the nanoparticles can be functionalized with an organic ligand having end groups that are reactive to the surface porous membrane material, e.g., reactive to an oxide surface, and are inert to the environment in which they are disposed. In one embodiment, the nanoparticles materials do not impart a surface charge. In other embodiments, the nanoparticles are surface charged. Exemplary nanoparticles include metals such as copper, gold, iron, silver, and the like; metal oxides such as titanium oxide, aluminum oxide, silicon oxide, zinc oxide, zirconium oxide, and the like; semiconductor materials; and the like. It should be noted that semiconductor nanoparticles are generally less preferred in view of their inherent costs. The particle sizes of the nanoparticles generally range from 2 to 20 nm depending on the diameter of the nanochannels in the porous membrane material, although smaller or larger particle sizes can be employed depending on the particular application.

The nanoparticles are functionalized by coating the nanoparticles with organic ligands. The organic ligands include at least one functional group that is sufficiently reactive to attach (e.g., form a covalent or ionic bond) the nanoparticles to the interior surface of the nanochannels initially formed in the membrane. Suitable organic ligands include, without limitation, compounds including end groups such as hydroxamic acid, carboxylic acid, phosphonic acid, dipyridine, terpyridine, phthalocyanine, or a combination comprising at least one of the foregoing end groups. A specific example of the aromatic compound is an aryldiazonium salt, which has a hydroxamic acid tail group. Other examples include a diazonium salt with phosphonic acid end group, and for oxide nanoparticles one can use bifunctional organic compounds such as diphosphonic acids, dihydroxamic acids or phosphonic acids with a carboxylic or hydroxamic end group.

Scheme I below provides an exemplary process for attaching an organic ligand to metal nanoparticles.

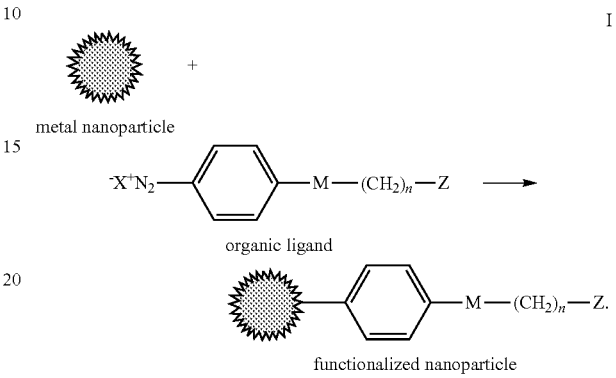

In this scheme, X is an anion, M is a divalent linkage, n is an integer from 1 to 500, and Z is a functional group reactive with the nanochannels surface. One or more of the organic ligands can be exchanged with a bifunctional organic molecule as may be desired for some applications.

FIG. 1 schematically illustrates a cross sectional view of the semi-permeable membrane generally designated by reference numeral 10. The semi-permeable membrane 10 includes a porous membrane material 16 that includes arrays 12 of parallel nanopores or nanochannels 14. The diameter of the nanopores is generally greater than 20 nm to 200 nm. The interior surfaces defining the nanochannel 14 are configured with a single monolayer of nanoparticles 18 so as to decrease the pore diameter to less than 10 nm. For desalination applications, the pore diameter is decreased to less than about 3 nm. In this manner, large electrolyte ions in the salt water such as sodium and chlorine ions are effectively blocked from transport though the membrane 10.

Figure 2:
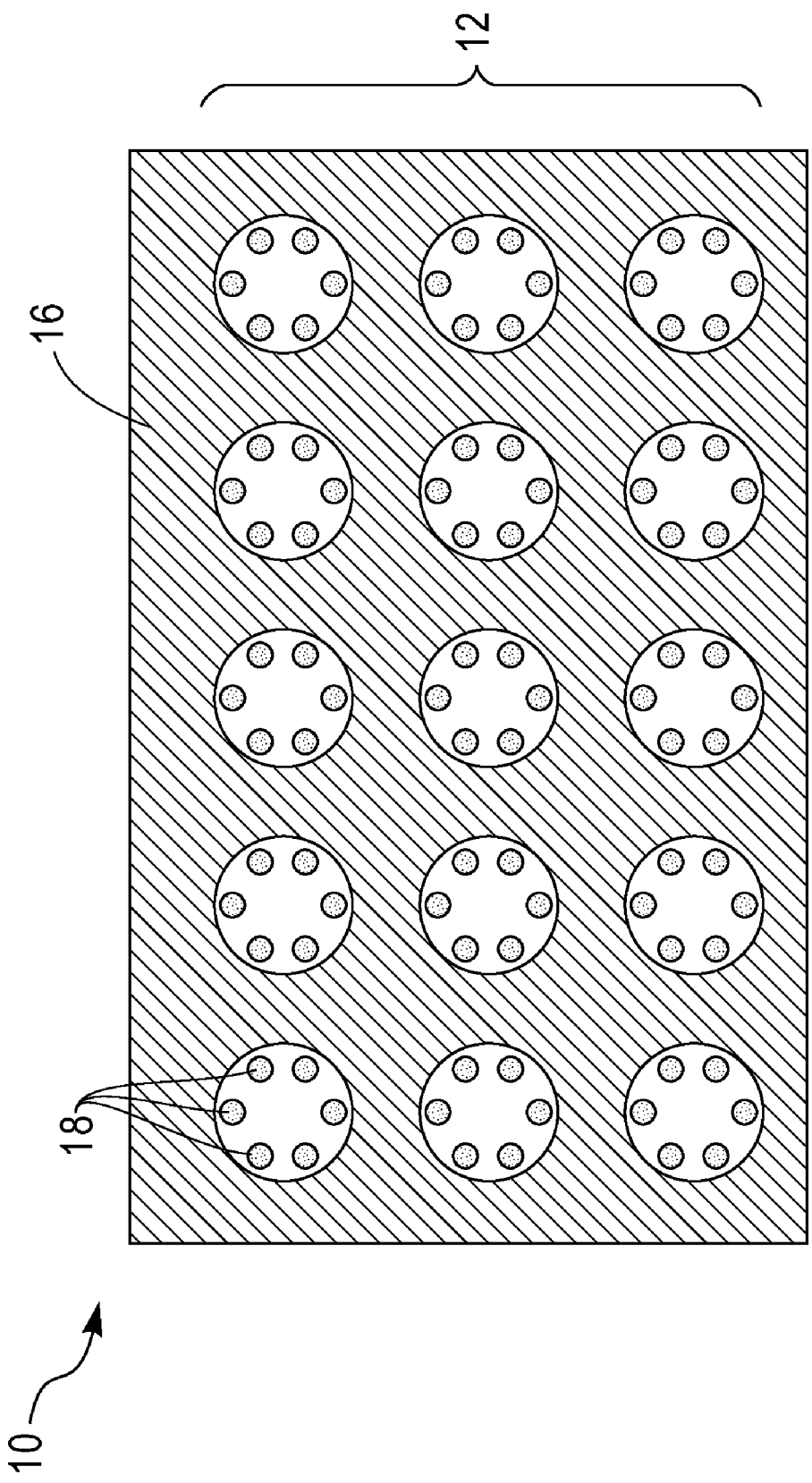
FIG. 2 is a top view of the membrane of FIG. 1 showing the nanochannels in accordance with one illustrative embodiment.

Referring to FIG. 2, a top view looking into an array 12 of parallel nanochannels 14 is illustratively shown. Each nanochannel 14 includes a self assembled monolayer of the functionalized nanoparticles 18. A device or membrane 10 for desalination applications can be fabricated having a final diameter of about 3 nm. Other sizes are also possible and may be employed depending on the application.

By way of example, the membrane material is an anodized aluminum oxide having a pore diameter of about 20 to about 30 nm. The nanochannel oxide surfaces react with the end group of the organic ligand coated nanoparticles provided in a solution to effectively narrow the ultimate diameter such that the distance of opposing nanoparticles is about 3 nm Referring to FIG. 3, a desalination device 100 includes one or more semi-permeable membrane or filter 102 having a large array of parallel nanochannels and a self assembled monolayer of functionalized nanoparticles. The membrane 102 may be configured on a grid, mesh or other structural member 110 for strength. The nanochannel arrays of membrane 102 separate a fluid volume in a first reservoir or container 104, e.g., containing a salt water solution from a second volume 106 in which the sodium and chlorine ions do not penetrate, hence forming desalinated water. The application of pressure P to the salinated side can be used to increase the permeation of water molecules through the nanopore/nanochannel array of the membrane 102. A mixer or other perturbation device 120 may be useful to stir the water in volume 104.

A pressure regulator device 112 may be employed to maintain the pressure P to ensure proper functioning of the desalination system 100. Alternately, a container may be configured to provide a working pressure P using the height of a water column in the fluid volume or container 104 or by other means.

Figure 3:
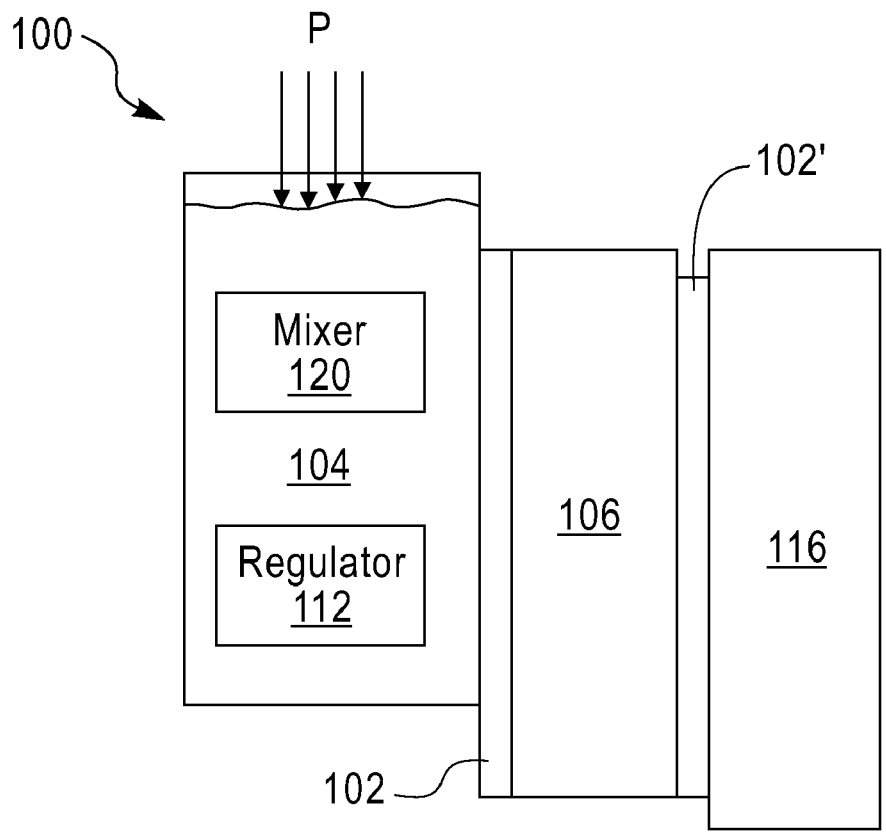
FIG. 3 is a block diagram illustrative depicting a desalination system in accordance with an illustrative embodiment.

The embodiment depicted in FIG. 3 may be extended to include a plurality of membranes in series to further refine the filtration. In one embodiment, different filtration stages may be employed wherein at each stage pressure is controlled to ensure that each stage is performing efficiently. This may include increasing or decreasing the intermediate pressures of the fluid at each stage.

A sequential embodiment may include additional membranes 102' and stages 116 for filtering at different dimensions. For example, sea water in the first volume 104 could go through an intermediate filter (102) first, which would block some but not all of the ions. A second-stage filter 102' could then be used with has different diameters for nanochannels and hence blocks a different concentration.

While desalination of water has been described as an illustrative example, other fluids may be filtered in accordance with the present principles. Advantageously, a desalination system can be provided that is passive (does not require a power source) and may be employed as an inexpensive desalination system, an emergency desalination system (e.g., on life rafts) etc.

Figure 4:
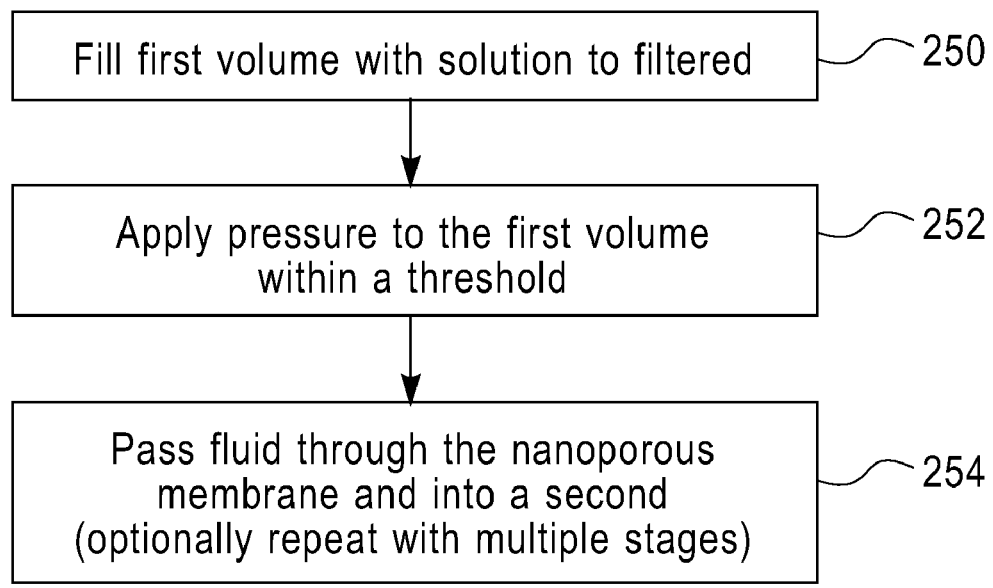
FIG. 4. schematically illustrates an exemplary process flow for filtering ions from an electrolytic fluid.

Referring to FIG. 4, a flow diagram is shown for an illustrative method for using a filter in accordance with the present principles. In block 250, a first volume is filled with an electrolytic solution. This volume is preferably mixed or constantly replenished. In block 252, a pressure is applied to the electrolytic solution in the first volume that is below a pressure threshold value. In block 254, a fluid of the electrolytic solution is passed into a second volume separated from the first volume by a membrane. The membrane has a plurality of nanochannels formed therein as described above. The fluid in the second volume is desalinated or partially desalinated. Additional stages may be added.

Having described preferred embodiments of a nanoporous semi-permeable membrane for desalination (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A filter, comprising:
a porous membrane having a plurality of nanochannels formed therein, wherein the nanochannels include an oxide surface and have a first diameter extending from an inlet opening to an outlet opening; and
a self assembled film of functionalized nanoparticles of a single monolayer extending from the inlet opening to the outlet opening, wherein the functionalized nanoparticles comprise a metal nanoparticle and an organic ligand disposed thereon having at least one functional group reactive with the oxide surface, wherein the self assembled film decreases the first diameter to a second diameter.

2. The filter as recited in claim 1, wherein the membrane comprises aluminum and the nanochannels are formed by using anodic aluminum oxide.

3. The filter as recited in claim 1, wherein the nano channels include a first diameter of between about 10 nm and 200 nm.

4. The filter as recited in claim 1, wherein the second diameter is about 2 to 3 nm.

5. The filter as recited in claim 4, wherein the nanoparticles have a surface charge effective to repel positive ions.

6. The filter as recited in claim 4, wherein the nanoparticles have a surface charge effective to repel negative ions.

7. The filter as recited in claim 4, wherein the nanoparticles have a neutral charge.

8. The filter as recited in claim 1, wherein the electrolytic solution includes sea water and the second diameter is 2 nm to 3 nm.

9. A filter system, comprising:
a first volume configured to receive an electrolytic solution at a pressure; and
a second volume separated from the first volume by a membrane having a plurality of nanochannels formed therein, the nanochannels including a first diameter, and a self assembled monolayer of metal nanoparticles attached to a surface of the nanochannels and extending from an inlet opening to an outlet opening, wherein the self assembled monolayer provide the filter system with a second diameter, the second diameter being less than the first diameter, and wherein the second diameter is effective to prevent transport of ions in the electrolytic solution through the membrane.

10. The filter system as recited in claim 9, further comprising a pressure regulator configured to regulate the pressure of the first volume.

11. The filter system as recited in claim 9, further comprising a support structure configured to support the membrane against the pressure.

12. The filter system as recited in claim 9, further comprising a mixer configured to mix fluid in the first volume.

13. The filter system as recited in claim 9, further comprising a plurality of membranes sequentially arranged to filter the electrolytic fluid and filtered electrolytic fluid.

14. The filter system as recited in claim 1, wherein the membrane comprises aluminum and the nanochannels are formed by anodization to form an oxide on a surface of the nano channels.

15. The filter as recited in claim 1, wherein the nanochannels include a first diameter of between about 20 nm and 30 nm and wherein the second diameter is about 2 to 3 nm.

16. The filter as recited in claim 1, wherein the electrolytic solution includes sea water and the second diameter is 2 nm to 3 nm.

17. A method for making a filter, comprising:
narrowing a diameter of each nanochannel in a porous membrane material comprising attaching a self assembled monolayer of functionalized nanoparticles to an interior surface of each nanochannel and extending from an inlet opening to an outlet opening, wherein each of the functionalized nanoparticles comprise a metal nanoparticle and an organic ligand attached to the nanoparticles comprising at least one functional group effective to react with and form a self assembled monolayer of the nanoparticles on the interior surface.

18. The method as recited in claim 17, wherein the porous membrane material comprises a porous anodic aluminum oxide material and the at least one functional group is reactive with the oxide.

19. The method as recited in claim 17, wherein the porous membrane material is formed by anodizing an aluminum film in an acid selected from the groups consisting of an oxalic acid, a sulfuric acid, a chromic acid, a phosphoric acid, and combinations thereof.

20. The method as recited in claim 17, wherein each nanochannel of the porous membrane material has a diameter of 20 nm to 40 nm and the functionalized nanoparticles attached to the interior surface of the nanochannel provides the filter with a diameter of 2 nm to 3 nm.

* * * * *